US011602708B1

(12) United States Patent
Solberg et al.

(10) Patent No.: US 11,602,708 B1
(45) Date of Patent: Mar. 14, 2023

(54) COMBINATION FILTER AND SILENCER ASSEMBLY

(71) Applicant: Solberg MFG., Inc, Itasca, IL (US)

(72) Inventors: Tor Solberg, Winnetka, IL (US); Clint Browning, Riverside, IL (US)

(*) Notice: Subject to any disclaimer, the term of this patent is extended or adjusted under 35 U.S.C. 154(b) by 0 days.

(21) Appl. No.: 17/076,797

(22) Filed: Oct. 21, 2020

Related U.S. Application Data

(60) Provisional application No. 62/925,182, filed on Oct. 23, 2019.

(51) Int. Cl.
*B01D 46/00* (2022.01)
*B01D 46/42* (2006.01)
*B01D 46/24* (2006.01)

(52) U.S. Cl.
CPC ..... *B01D 46/0005* (2013.01); *B01D 46/2414* (2013.01); *B01D 46/4236* (2013.01)

(58) Field of Classification Search
CPC ............ B01D 46/0005; B01D 46/2414; B01D 46/4236
USPC .................................. 96/380, 381, 384, 387
See application file for complete search history.

(56) References Cited

U.S. PATENT DOCUMENTS

| 4,971,612 | A | * | 11/1990 | Loughran | ............... F01N 1/082 181/258 |
| 2005/0284118 | A1 | * | 12/2005 | Nishiyama | ............. B01D 46/88 55/498 |
| 2011/0088966 | A1 | * | 4/2011 | Geyer, III | ............... F01N 1/082 181/224 |
| 2014/0298612 | A1 | * | 10/2014 | Williams | ........... B01D 46/2414 55/498 |
| 2018/0080419 | A1 | * | 3/2018 | Bringhurst | ............. F02M 35/04 |
| 2019/0321764 | A1 | * | 10/2019 | Louison | ........... F02M 35/02466 |

* cited by examiner

*Primary Examiner* — Robert A Hopkins
*Assistant Examiner* — Qianping He
(74) *Attorney, Agent, or Firm* — James B. Conte; CR Miles P.C.

(57) ABSTRACT

A silencer element is disposed in the throat void space of a filter element. A carrier includes a first seat upon which the filter element sits and a sealing surface which forms an airtight seal with the silencer element. The silencer element includes sound absorbing media. The sound absorbing media inward surface delimits a throat void space. Inward of the sound absorbing media inward surface, is an, air permeable, porous, sound permeable inner sidewall which delimits void spaces which comprise through openings to the sound absorbing media inward surface. Outward of the sound absorbing media outward surface is a cylindrical, air permeable, porous, sound permeable outer sidewall which delimits void spaces which comprise through openings to the sound absorbing media outward surface.

11 Claims, 10 Drawing Sheets

COMBINATION FILTER AND SILENCER ASSEMBLY

CROSS-REFERENCE TO RELATED APPLICATIONS

The present application claims domestic priority from provisional application 62/925,182 filed Oct. 23, 2019.

FIELD

The present disclosure concerns a silencer element disposed in the throat of a filter element. The filter element is outward of silencer element. A carrier includes a first seat upon which the filter element sits and a sealing surface which forms an airtight seal with the silencer element.

BACKGROUND

U.S. Pat. No. 7,878,295, Silencer Apparatus With Disposable Silencer Cartridge Unit, Robert Geyer, describes that a combination of the silencer housing, core wall, enclosure, absorptive media, and optionally the outer wall are intended to provide a desired noise attenuation effect, the housing acts as a noise barrier, and therefore must be formed of an impermeable material (such as a steel, plastic, etc.) to form an airtight seal surrounding the silencer cartridge unit. Furthermore, Geyer recites that the outer wall of the silencer cartridge unit does not need to be impermeable and may even be omitted. In this case the unit must be installed in an appropriately-configured housing that is air-impermeable and forms an airtight seal around the unit. Geyer also indicates improved noise attenuation can be achieved by forming the silencer unit to include the outer wall and form the wall of an impermeable material, thus adding an additional noise barrier.

Geyer states that in the case of when the filtration unit forms the housing [of the silencer apparatus], the outer wall of the silencer cartridge unit must be impermeable, acting as a noise barrier. Geyer as an example of a permeable inner core wall recites the wall being formed of perforated or expanded metal or plastic.

SUMMARY OF INVENTION

Figure 1:
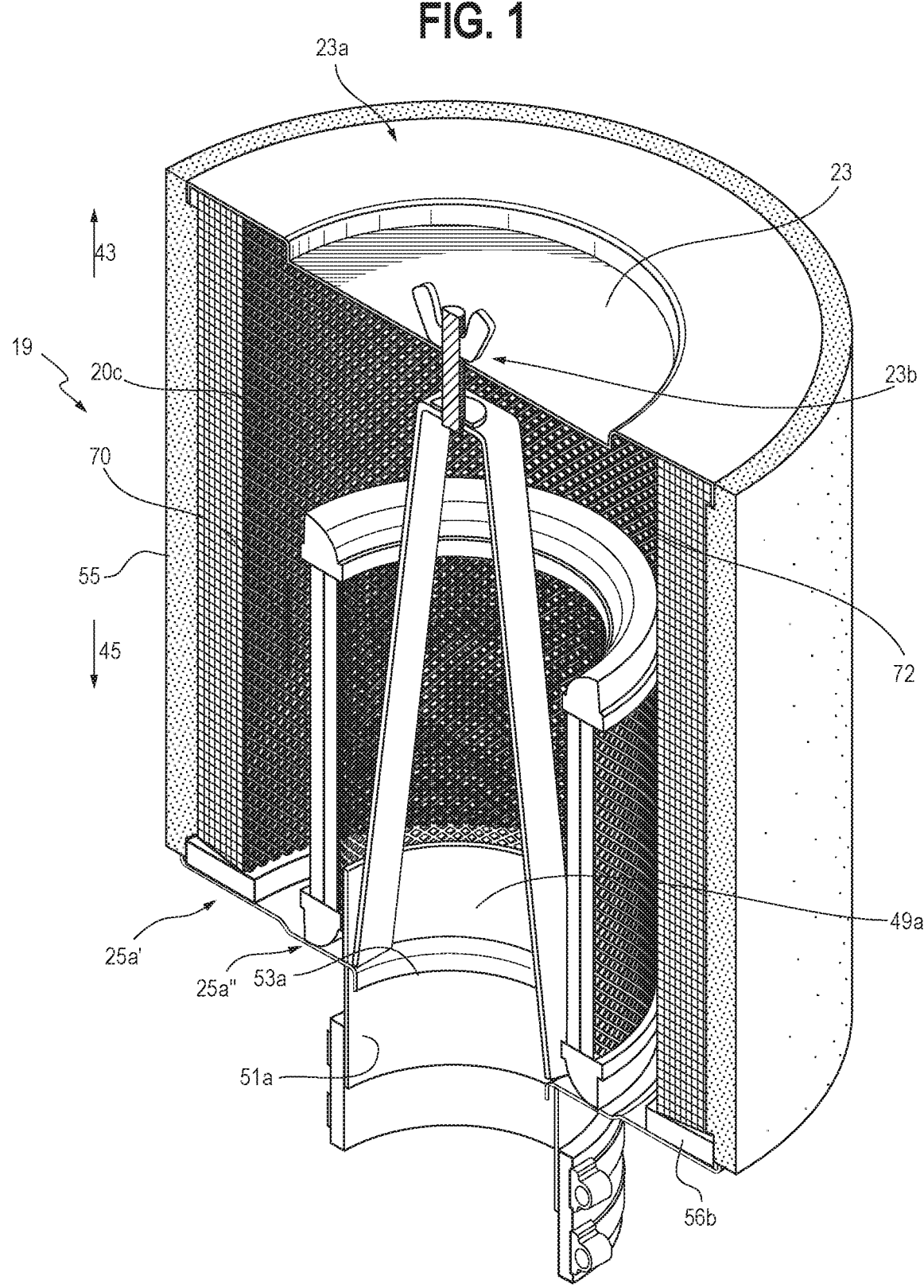
FIG. 1 is an isometric cross-sectional view of the filter element and silencer element assembly embodying the present invention.
Figure 2:
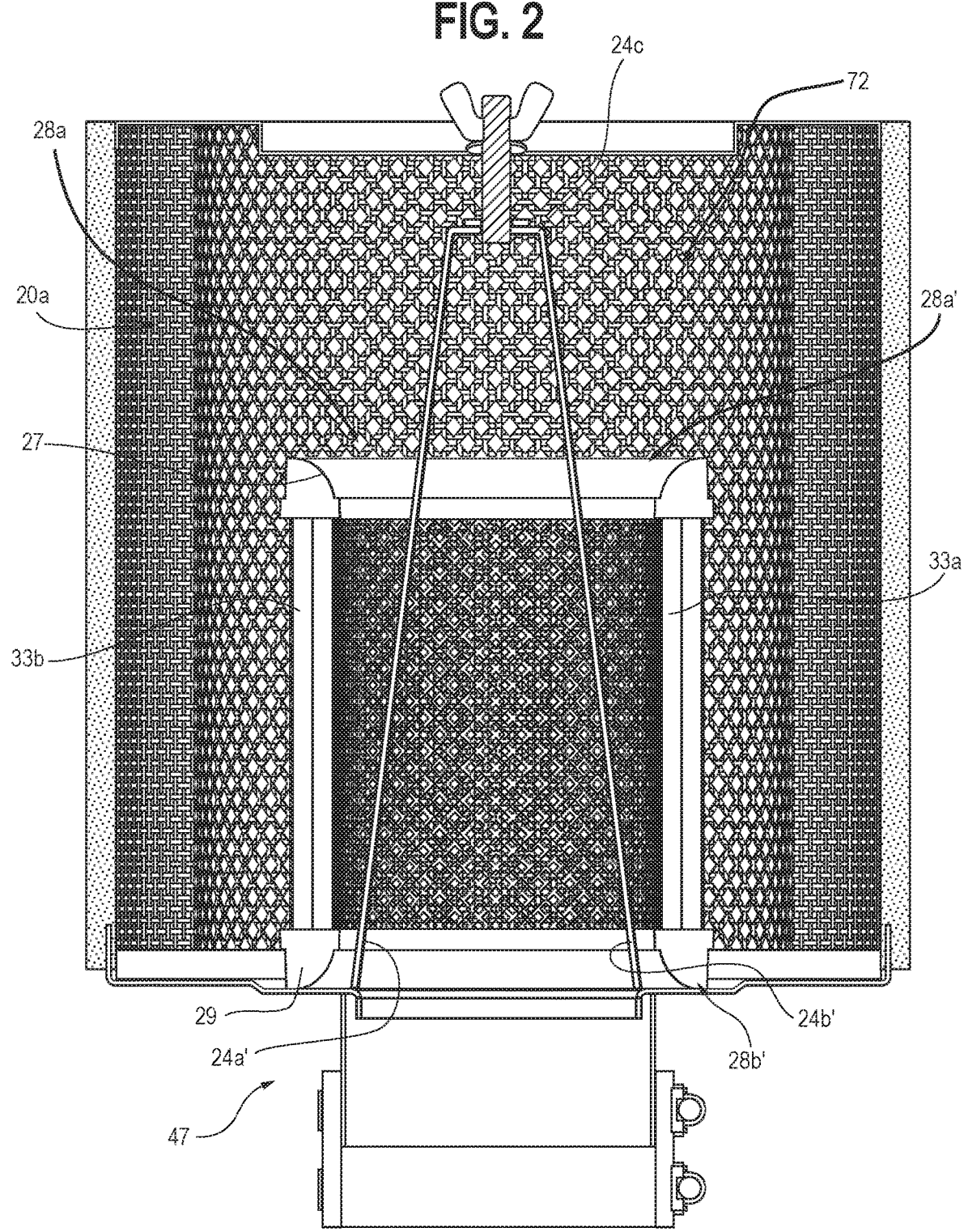
FIG. 2 is a side facing cross-sectional view of the assembly shown in FIG. 1.
Figure 3:
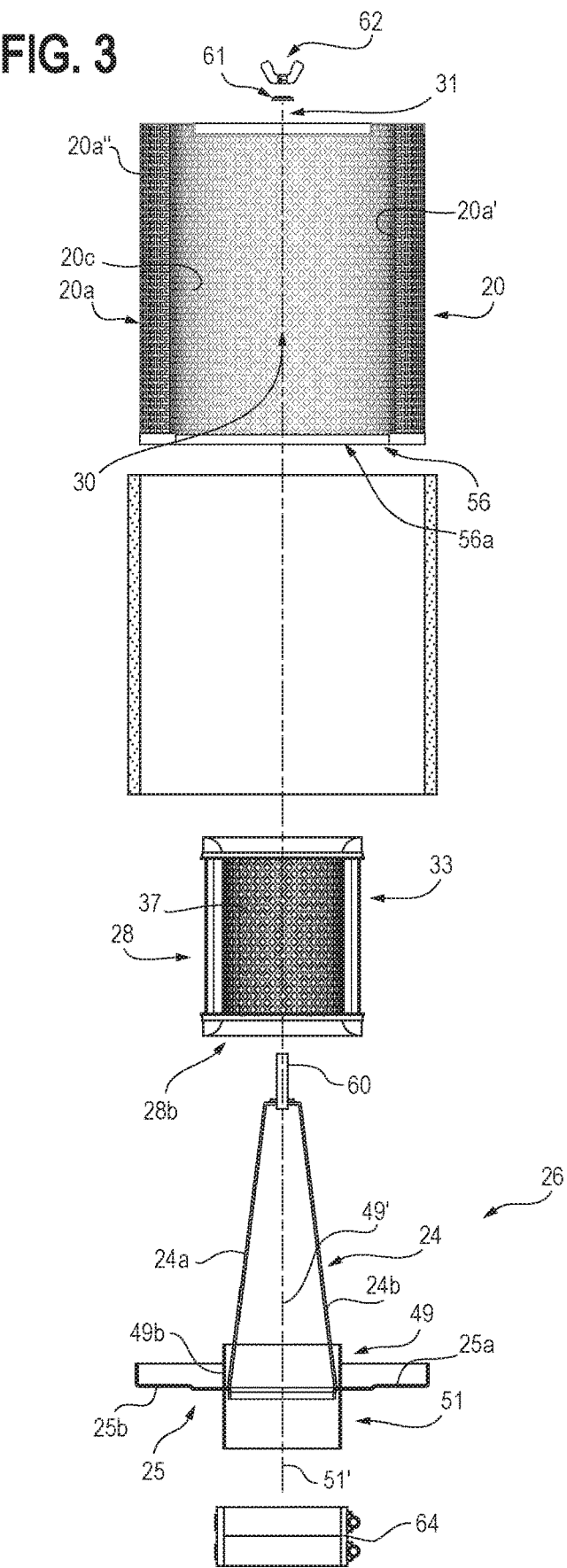
FIG. 3 is an exploded view of the assembly shown in FIG. 2.
Figure 4:
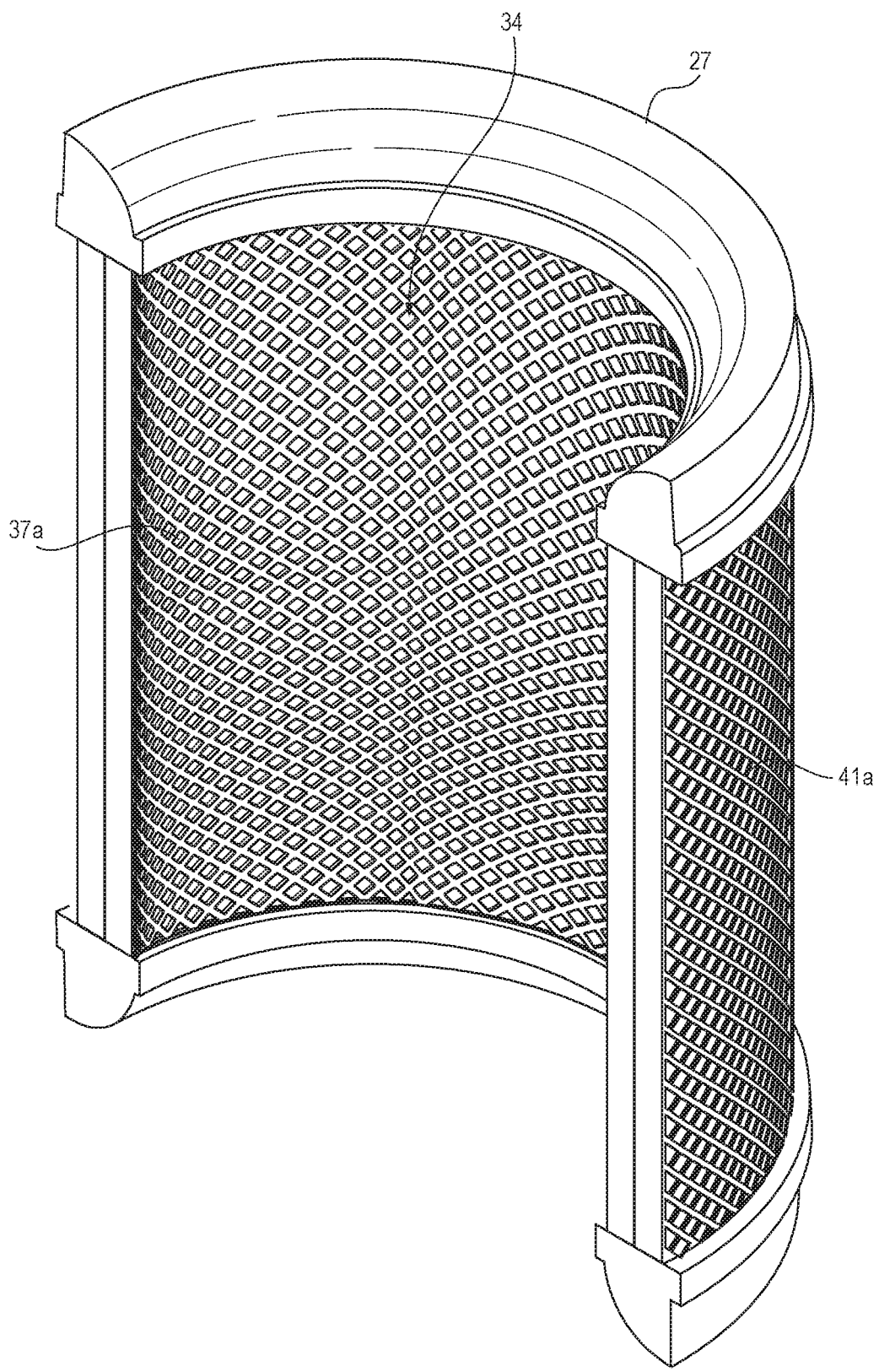
FIG. 4 is an isometric cross-sectional view of the silencer element shown in FIG. 1.
Figure 5:
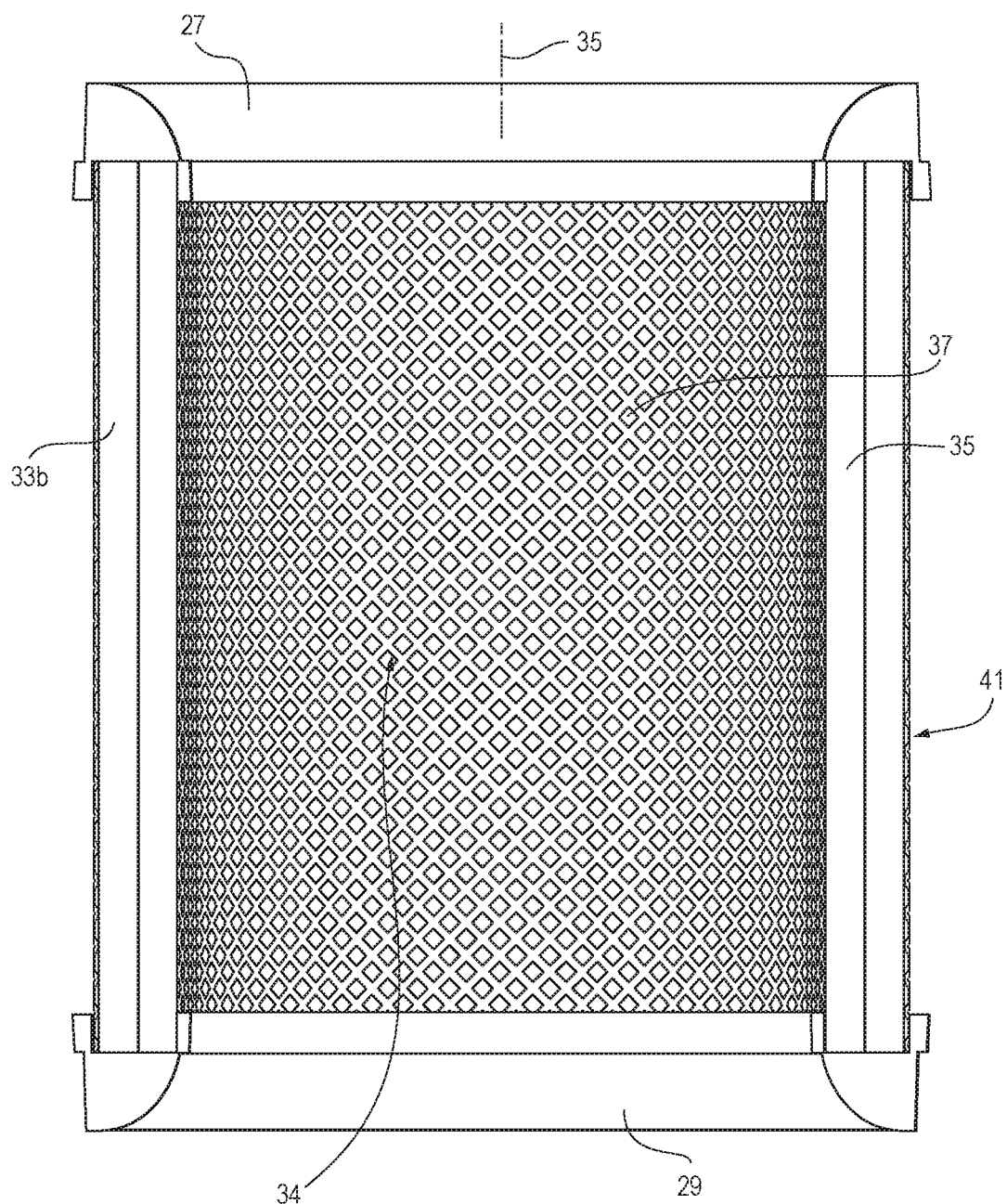
FIG. 5 is a side facing cross-sectional view of the silencer element shown in FIG. 4.
Figure 6:
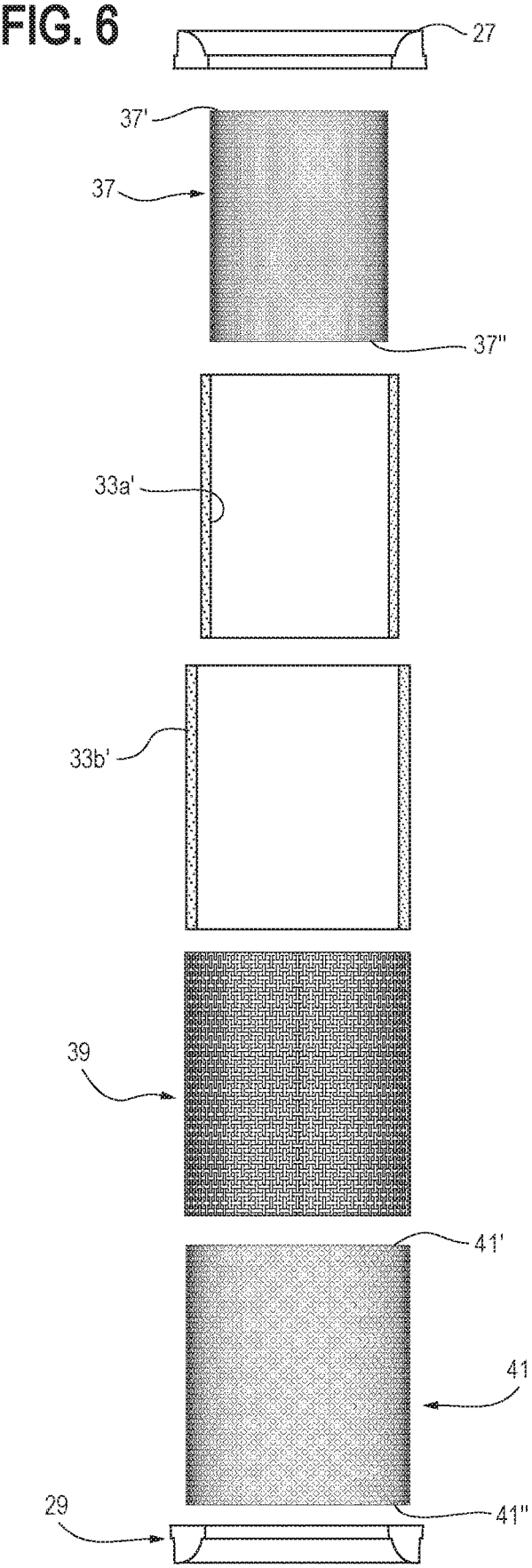
FIG. 6 is an exploded view of the silencer element shown in FIG. 5.
Figure 7:
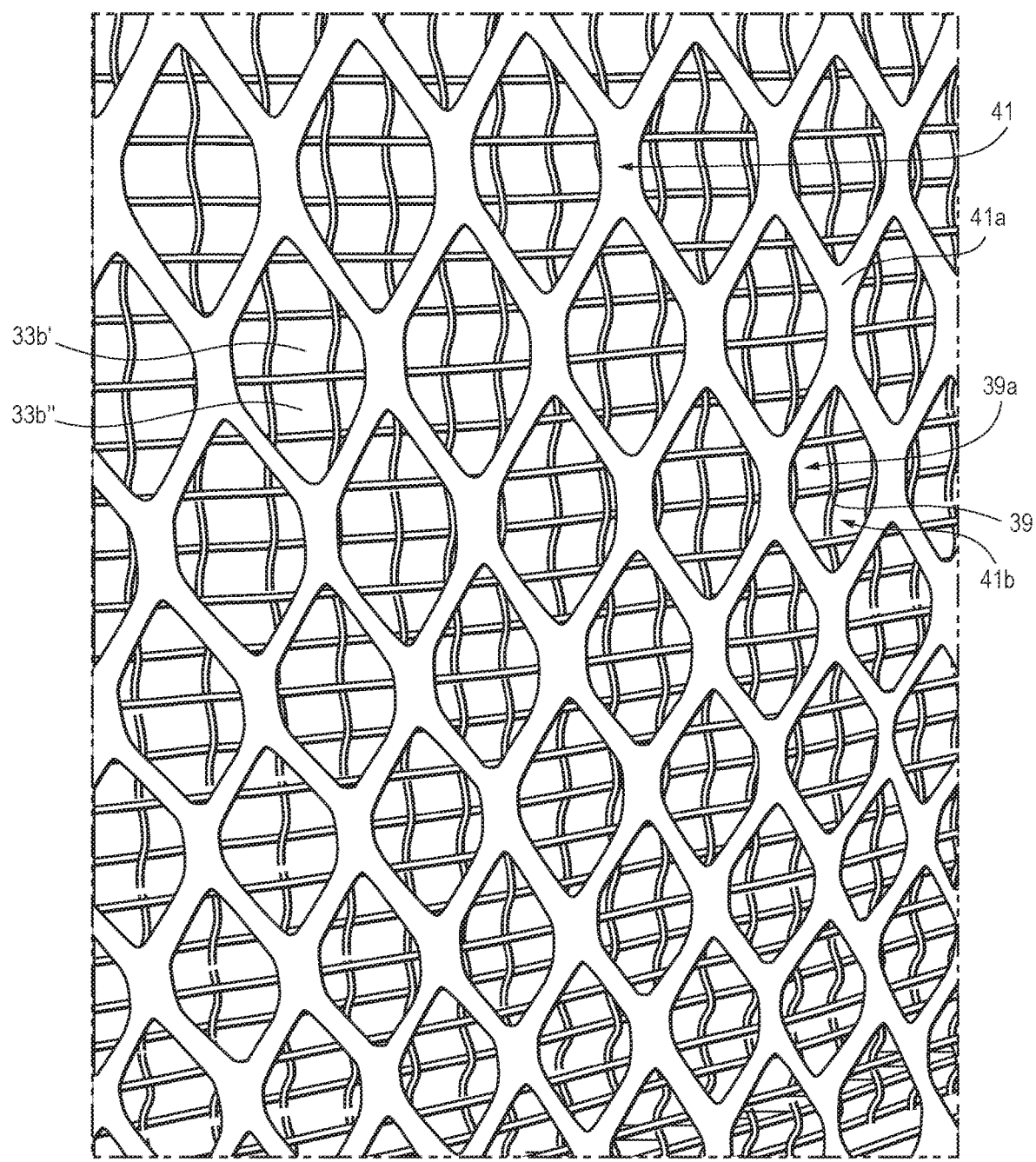
FIG. 7 is a closeup view of the outer diameter of the silencer element of FIG. 4 showing the radially outward surface of the sound absorbing media of the silencer element, the outer wire mesh and the outer expanded metal sidewall.
Figure 8:
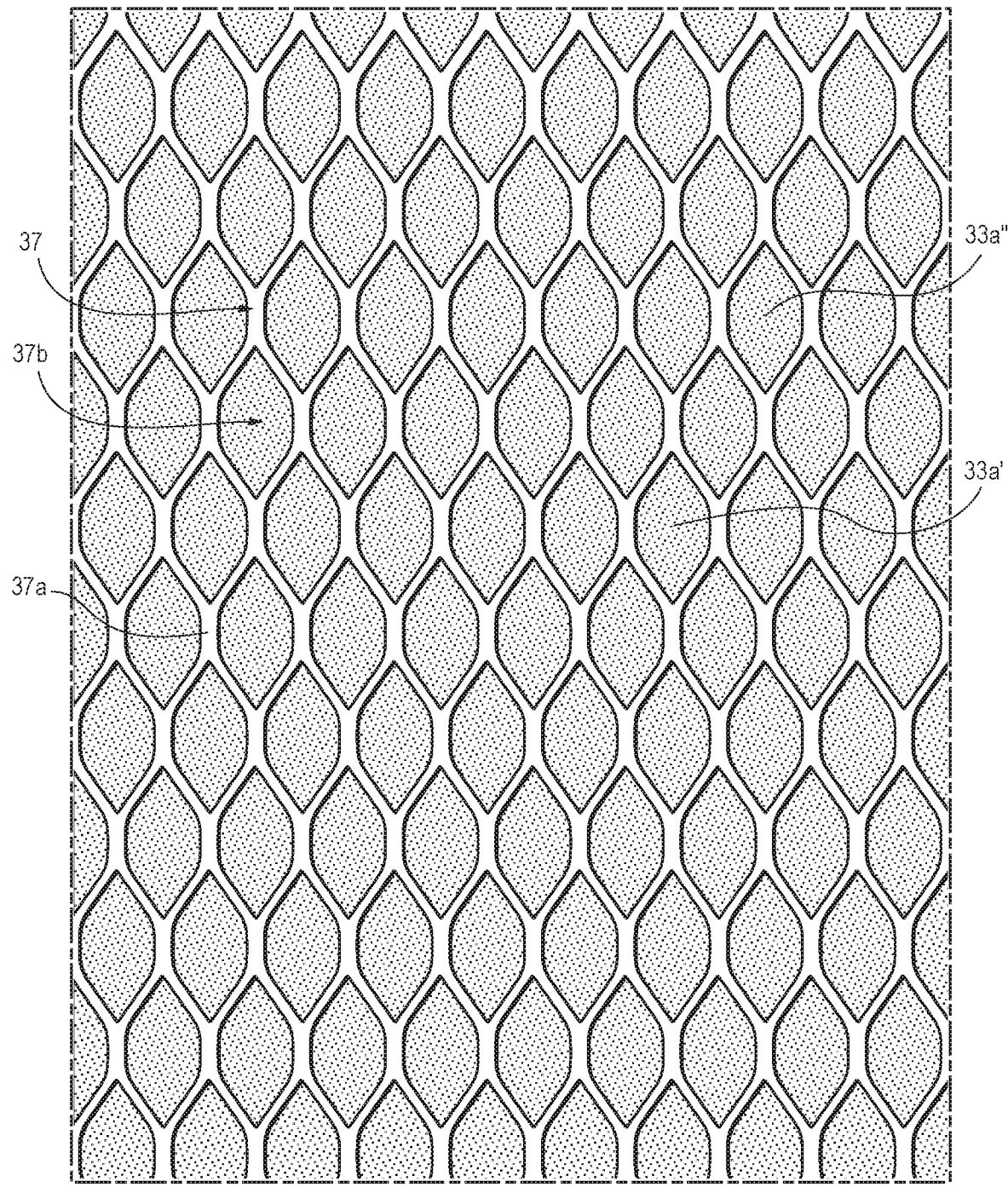
FIG. 8 is a closeup view of the inner diameter of the silencer element of FIG. 4 showing the radially inward surface of the sound absorbing media of the silencer element and the expanded metal inner sidewall.
Figure 9:
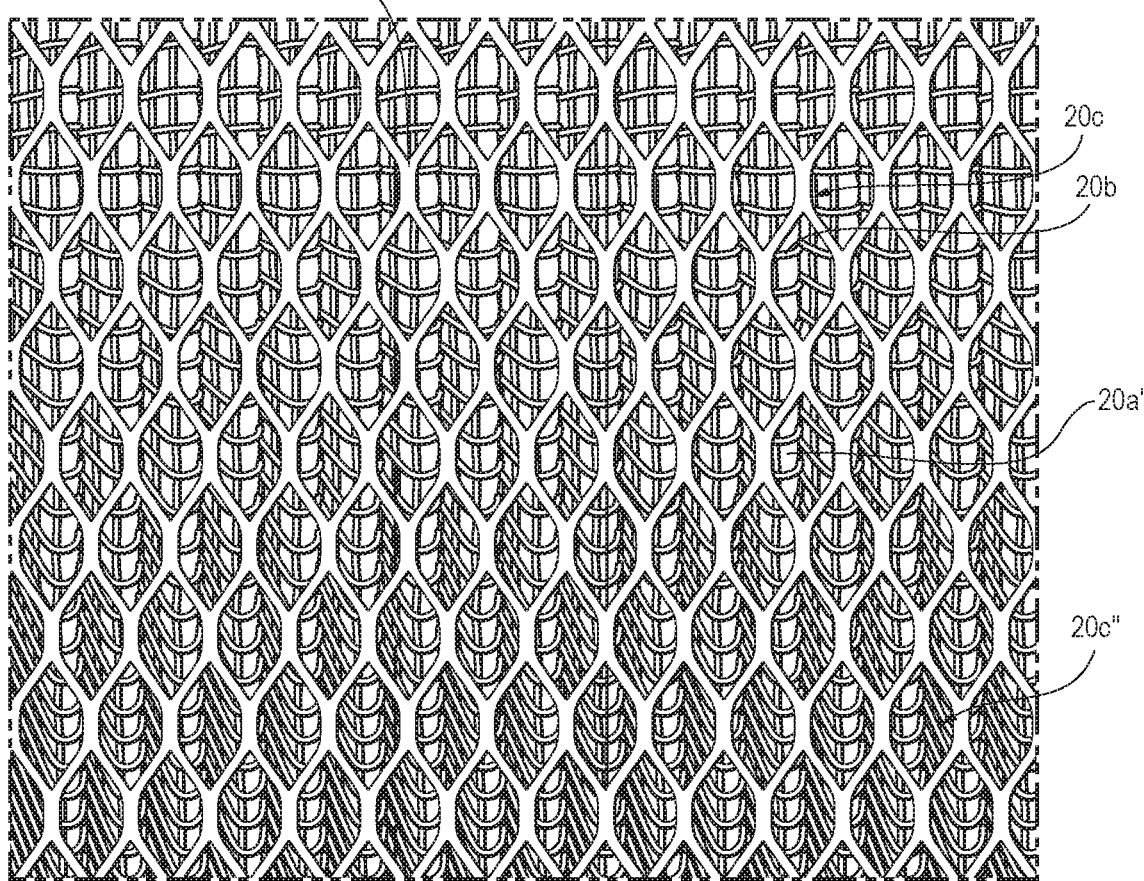
FIG. 9 is a closeup view of the inner diameter of the filter element of FIG. 2 showing the element's radially inward filter media surface, the wire mesh and the radially inward expanded metal inner sidewall.
Figure 10:
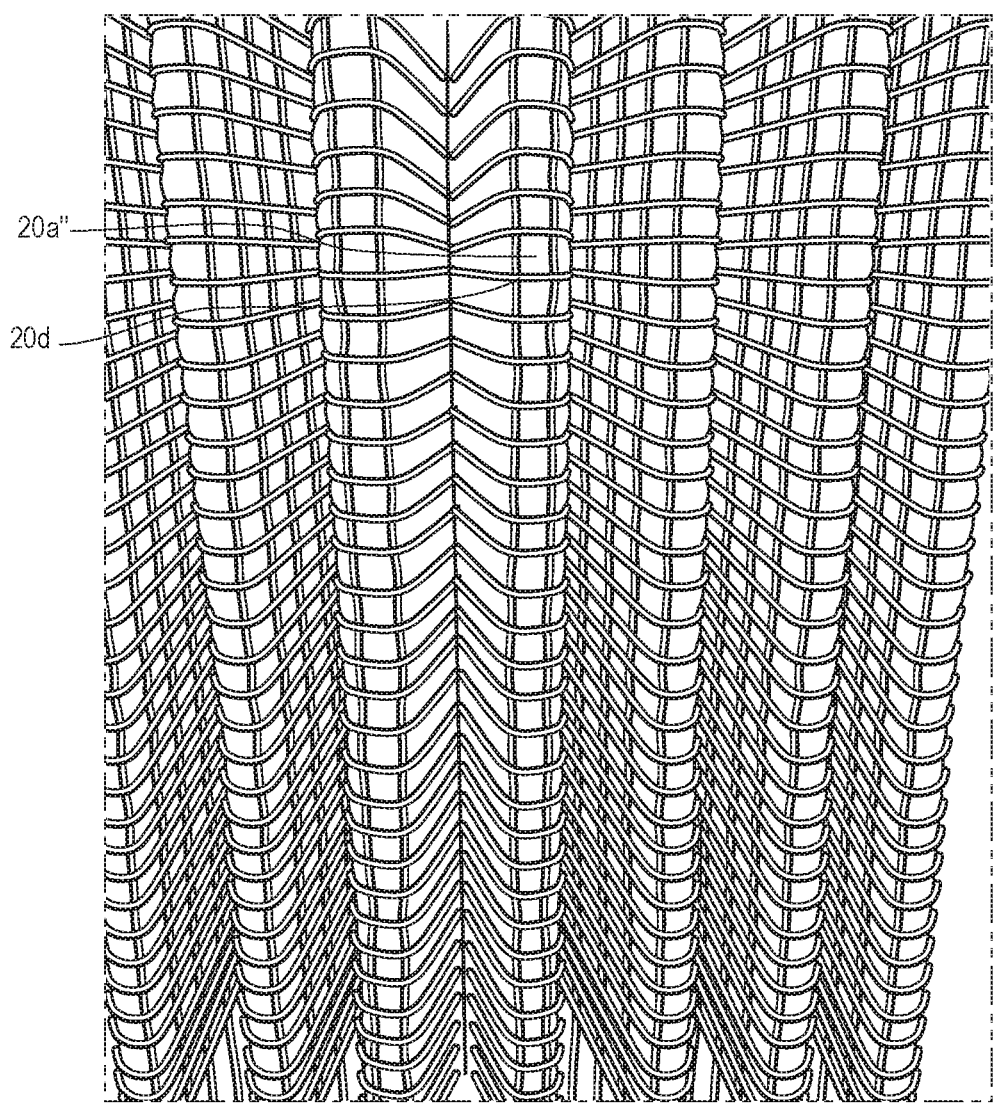
FIG. 10 is a closeup view of the outer diameter of the filter element of FIG. 2 showing the element's radially outward filter media surface and the wire mesh.

Before any embodiments of the invention are explained in detail, it is to be understood that the invention is not limited in its application to the details of construction and arrangement of components set forth in the following description or as illustrated in the drawings. The invention is capable of other embodiments and of being practiced or of being carried out in various ways. Also, it is to be understood that the phraseology and terminology used herein is for description and should not be regarded as limiting. The use of "including," "comprising" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

A filter element and silencer element assembly 20 includes a circumferential cylindrical shaped filter element 20 coupled to a bracket 24 of a carrier 26. The filter element 20 surrounds a circumferential cylindrical shaped silencer element 28 also coupled to the carrier. The silencer element 28 is disposed in the throat void space 30 of the filter element 20. The filter element throat void space 30 has a longitudinal length. A longitudinal axis 31 extends through the longitudinal length of the throat void space 30 of the filter element 20. The axis 31 is the longitudinal axis of the filter element. The carrier 26 includes a base 25 upon which the filter element 20 sits and upon which the silencer element 28 should sit.

The silencer element 28, in more detail, includes sound absorbing media 33. The sound absorbing media forms a circumferential cylindrical shape. The sound absorbing media is also porous and permeable to air. The media is air filter media. The media includes a porous, air permeable, and sound absorbing polyester portion 33a. The polyester portion is air filter media. The polyester portion is a wrapped construction which forms a circumferential cylindrical shape. The, sound absorbing media, and more particularly the polyester portion, has a radially inward surface 33a' that delimits a silencer throat void space 34 in a radial direction moving radially outward from the silencer axis 35. The inward surface 33a' forms an inner diameter of the sound absorbing media 33. Further at least portions of the media inward surface are exposed and uncovered 33a" portions of the silencer element. The sound absorbing media 33 also includes a porous, air permeable, sound absorbing fiberglass portion 33b. The fiberglass portion is air filter media. The fiberglass portion is radially outward of the of the polyester portion relative to the silencer element axis 35. The fiberglass portion wraps about the outer diameter, relative to the silencer axis, of the polyester portion and forms a circumferential cylindrical shape. A radially outward surface 33b' of the sound absorbing media, and more particularly of the fiberglass portion 33b, relative to the silencer axis, forms an outer diameter of the sound absorbing media and portions of the outward surface delimit an exposed and uncovered surface 33b" of the silencer element. Although the sound absorbing media 33 described comprises both polyester 33a and fiberglass 33b it could comprise only polyester or paper or fiberglass. It could also comprise combinations of these materials.

The silencer element further comprises, radially inward of the sound absorbing media radially inward surface 33a', relative to the silencer axis 35, a circumferential cylindrical, air permeable, porous, sound permeable inner wall 37. The inner wall is a silencer element inner sidewall 37. The sidewall 37 has a radially inward facing surface 37a forming an inner diameter of the silencer throat void space 34. The wall 37 is a lattice structure having material delimiting void spaces 37b through which sound waves pass therethrough to the sound absorbing media 33. The void spaces 37b comprise through spaces which open up to the sound absorbing media radially inward surface 33a'. The void spaces are thus through openings to the sound absorbing media radially inward surface 33a'. The inner sidewall 37 is an expanded metal wall. The wall can be made of other material such as plastic. The wall can be another structure such as a perforated material. The perforations being through openings to the sound absorbing media radially inward facing surface 33a'. The inner sidewall 37 is a first sidewall 37 of the silencer element 28.

The silencer element, radially outward of the fiberglass filter media outward surface 33b', has a wire mesh 39 delimiting void spaces 39a. The wire mesh overlaps the fiberglass outward surface. The wire mesh is a lattice structure. The mesh has a circumferential cylindrical shape. Overlapping the wire mesh 39 and fiberglass outer surface 33b' is a circumferential cylindrical, air permeable, porous, sound permeable silencer outer sidewall 41. The outer sidewall 41 is an outer sidewall 41 of the silencer element 28. The outer sidewall is a second sidewall 41 of the filter element 28. The outer sidewall 41 has a radially outward surface 41a forming an outer diameter of the silence element. The wall 41 is a lattice structure having material delimiting void spaces 41b. The void spaces 41b of the outer sidewall and wire mesh void spaces 39a overlap to comprise through spaces which open up to the sound absorbing media 33 and more particularly the radially outward surface 33b' of the sound absorbing media. Sound waves pass through the through spaces to the sound absorbing media radially outward surface 33b'. The inner sidewall 37 and outer sidewall 41 are the same construction and enclose the sound absorbing media 33.

The silencer element 28 at a first end 28a delimits a first opening 28a' into the throat void space 34 of the silencer element 28. The first end 28a is a first open end 28a. The silencer element at a second end 28b, axially opposite the first end, delimits a second opening 28b' into the throat void space 34 of the silencer element. The second end 28b is a second open end 28b. The silencer element 28 at the first end 28a has a first end wall 27 in the shape of a ring which delimits the first opening 28a'. The end wall 27 covers and is affixed to first axial ends 37', 41' of the inner 37 and outer 41 sidewalls. The end wall 27 overlaps first axial end of the sound absorbing media and wire mesh. The first end wall 27 is an elastomeric material such as rubber which tapers in a direction going towards the interior and from the exterior of the throat void space 34. The silencer element at the second end 28b has a ring shaped second end wall 29 which covers and is affixed to second axial ends 37", 41" of the inner 37 and outer side 41 walls. The second end wall 29 overlaps the second axial ends of the sound absorbing media and wire mesh. The second end wall is an elastomeric material such as rubber which tapers in a direction going towards the interior and from the exterior of the throat 34. The second end wall 29 delimits the second opening 28b'. The first 27 and second 29 end walls fix the outer 41 and inner 37 sidewalls in place relative to each other and relative to the sound absorbing media 33 and wire mesh. 39 The first 27 and second 29 end walls are the same shape and construction.

The carrier base 25, has a first base surface 25a that faces in an axial direction in the direction of extension of the carrier bracket. The direction is a first direction 43. The first base surface forms a first seating surface 25a' and a second seating surface 25a". The base 25 has a second surface 25b which faces in a second direction 45 away from the base first surface 25a'. The air outlet 47 of the carrier 26 has structure that delimits the void space of the air outlet 47 of the assembly. The structure includes a first tubular member 49 extending in the first axial direction 43 away from the carrier base 25 and in the direction of extension of the bracket 24. The tubular member 49 extends in the first direction 43 into the throat void space 34 of the silencer element 28 when the element 28 is installed on the carrier 26. An interior facing surface 49a of the tubular sidewall 49 facing in the direction towards the sidewall's axis 49' delimits the void space of the air outlet 47 in the radial direction going outward from the axis of the tubular member 49. The structure defining the void space of the air outlet 47 further comprises a second tubular member or sidewall 51 extending in the second direction 45 away from the carrier base and away from the cover 23 of the filter element 20 and away from the end of the bracket 24. The second tubular member 51 also has an interior facing sidewall surface 51a which faces in the direction towards the tubular member's axis 51' and which delimits the void space of the air outlet 47 in the radial direction going outward from the axis 51' of the tubular member 51. The carrier 26 air outlet further comprises a circumferential sidewall 53 between the first 49 and second 51 tubular members. The sidewall has a surface 53a facing inward in the direction towards the axis 49' of the first tubular member. The sidewall surface 53a delimits the void space of the air outlet 47 in the direction going outward from the first tubular member axis 49'. The axis of the first tubular member and the second tubular member are coextensive and form the longitudinal axis of the air outlet 47. The axis of the air outlet is coextensive with the longitudinal axis 35 of the silencer element. The bracket 24 has a first leg 24a and a second leg 24b coupled together at a u-shaped portion 24c of the bracket. Each leg has one end 24a', 24b' connected to a portion of the carrier 26. More particularly each end is coupled to the inward facing surface 49a of the first tubular member 49. The legs 24a, 24b thus extend out from the void space of the air outlet 47 delimited by the first tubular member 49. The direction of extension of each leg is away from the base 25 in the first direction 43 towards the filter element cover 23 when the filter element is in the installed position.

The first tubular member 49 has an outward facing surface 49b that faces away from the tubular member axis 49' and towards an outer perimeter of the carrier 26 and towards the silencer element 28. The outward facing surface 49b is a circumferential surface extending in the first longitudinal direction 43 of the tubular member's axis and is a sealing surface 49b. The sealing surface contacts the silencer element to form an airtight seal with the silencer element. An outer surface of the silencer second end wall 29 overlaps, circumscribes, and contacts the carrier circumferential sealing surface 49b to form an airtight seal with the carrier circumferential wall 49 and thereby with the air outlet 47. The contact forms an interference friction fit between the second end wall 29 and the circumferential surface 49b. To support the silencer element and stop movement in the longitudinal second direction, the carrier has a second seating surface 25a″ which faces in the first direction 43 towards the filter element cover 23 and a first end of the carrier bracket. Preferably, the assembly when in an operational state has the second end wall 29 seated against the second seating surface 25a″.

The filter element 20, in more detail, includes filter media 20a which is porous and air permeable. The media forms a circumferential cylindrical shape. The media 20a has a radially inward surface that delimits the filter element throat void space 30 in a radial direction moving radially outward from the filter element axis 31. The inward surface 20a' forms an inner diameter of the filter media 20. A radially outward surface 20a″ of the media, relative to the filter element axis 31, forms an outer diameter of the filter media. Although the present media is pleated polyester it could comprise other material such as paper or fiberglass or combinations of these materials. It could also have a wrapped structure as opposed to a pleated structure.

The filter element 20 further comprises, radially inward of the filter media 20a, wire mesh 20b which overlaps and follows the outline of the media's inward pleated surface 20a'. Radially inward of the media inner surface is a circumferential, cylindrical, air permeable, porous, sound permeable inner wall 20c. The inner wall is a filter element inner sidewall 20c. The sidewall has a radially inward surface 20c' forming an inner diameter of the filter element throat void space 30. The sidewall 20c is a lattice structure having material delimiting void spaces 20c″ through which air passes therethrough from the filter media. The wall is an expanded metal wall. The wall can be made of other material such as plastic. The wall can be another structure.

The filter element, radially outward of the media's outward surface, has a wire mesh 20d which overlaps and follows the outline of the media's outward pleated surface 20a″. Overlapping the wire mesh and media outer surface is a circumferential cylindrical, air permeable, porous, prefilter 55 made of foam material. The pre-filter is optional.

The filter element at a first end 56 delimits a first opening 56a into the throat void space 30 of the filter element 20. The filter element at the first end has a first end wall 56b in the shape of a ring which delimits the first opening 56a. The end wall 56b covers and is affixed to first axial ends of the inner sidewall 20c, and wire meshes, 20b, 20c. The end wall 56b overlaps an axial end of the filter media 20a. The first end wall 56b is an elastomeric material such as rubber and is a sealing ring which creates an airtight seal with the carrier first seat 25a' when the filter element 20 is operationally connected to the bracket 24 as explained below. The filter element at a second end 23a, axially opposite the first end 56, has a second end wall 23 that closes and covers the throat void space 30 in the axial direction. The second end wall 23 can be considered a cover 23 of the filter element 20. The second end wall covers axial ends of the mesh 20b, 20d and inner sidewall 20c and overlaps and contacts the media 20a.

To connect the silencer element 28 to the carrier 26 in an installed operable position, the silencer element 28 is disposed to pass the bracket 24 into and extend out of the cylindrical throat void space 34 of the silencer element 28. The silencer element 28, while circumscribing the bracket 24 is moved in the second direction 45 towards the base first surface 25a. The direction is the second direction 45 opposite the first direction 43. The second end wall 29 is oriented to circumscribe, overlap and contact the carrier circumferential sealing surface 49b formed by the first tubular wall 49 outward facing surface 49b. The second end wall 29 is oriented further in the second direction to sit on the second seating surface 25a″.

The silencer element 28 has a unitary fixed construction. It can be carried and moved in its entirety and maintain its unitary fixed construction, for instance, by gripping only the first end wall 27, second end wall 29, or second sidewall 41 and apply a moving force to only the gripped member.

Post connecting the silencer element 28 to the carrier 26, to connect the filter element 20 to the carrier 26, in an installed operable position, the throat void space 30 of the filter element 20 is oriented to pass over and overlap the silencer element 28 and move the filter element 20 first end 56 towards the carrier base 25. The carrier bracket 24 and silencer element 28 are received into and by the filter element throat void space 30. The threaded elongated member 60, such as a lug, of the carrier 26 is inserted through a through hole 23b of the filter element cover 23. During the insertion, the filter element first end 56 is moved in the second direction 45 towards the base seating surface 25a'. To orient the first end 56 onto the first seat 25a', the filter element 20 is moved towards the base 25 until it sits on the first seating surface 25a'. The movement over the lug 60 and the movement of the first end 56 happen at the same time. The lug 60 of the present example is at the bracket end and extends in the axial first direction 43 away from the carrier base 25. A sealing washer 61 or other type of seal is disposed around the lug 60. A nut 62, such as a wing nut, is threaded onto the lug 60 to such a degree that the sealing ring 50b of the filter element 20 at the fist end 56 is placed in sealing engagement with the carrier first seat 25a' and the sealing washer 61 is in sealing engagement with the cover 50b. The silencer element 28 is in the filter element throat void space 30.

Accordingly, the assembly in an operable state comprises the silencer element 28 being in an operable orientation and the filter element 20 being in an operable orientation. The silencer element 28 in the operable orientation has its second end wall 29 contacting the carrier sealing surface 49b to form an airtight seal with the silencer element 28. In more detail, the outer surface 49b of the silencer second end wall 29 overlaps, circumscribes, and contacts the carrier circumferential sealing surface 49b to form the airtight seal with the carrier circumferential surface 49b and thereby with the air outlet 47. The contact forms an interference friction fit between the second end wall 29 and the circumferential surface 49b. The silencer element 29 preferably sits on the second seating surface 25a″. The tubular wall 49 extends into the silencer element throat void space 34 and bracket 24 extends through the silencer element throat void space 34.

The filter element 20 in an operable orientation comprises the element sitting on the first seating surface 25a' and in sealing engagement therewith to form an airtight seal. The lug 60 extends through the cover 23. The nut 62 is threaded on the lug 60. The sealing washer 61 is in sealing engagement with the cover 23. The silencer element 28 is in the filter element throat void space 30. The bracket 24 extends into the throat void space 30. To further orient the assembly in a connected orientation, the second tubular member 51 is connected to the machine air intake with a band clamp 64.

The filter element 20 and silencer element 28 when in the operable orientation delimit a circumferential void space 70.

The inward surface 20a' of the filter element media 20a and inward surface 20c' of the filter element inner sidewall 20c delimit the circumferential void space in the radial direction moving away from the filter elements axis 31 towards the filter element outer diameter. The silencer element 28 also delimits the circumferential void space 70. The sound absorbing media radially outward surface 33b, the wire mesh surface 39, and the radial outward surface 41a of the silencer outer sidewall 41 delimit the circumferential void space 70 in the radial direction going away from the inward surface 20a' of the filter element media 20a towards the silencer element axis 35. The circumferential void space 70 comprises an open area between the silencer element and the filter element. The circumferential void space comprises a portion of the filter element throat void space 30. An open area void space 72, delimited by the assembly, is open both to the circumferential void space 70, the silencer element opening 28a' at the silencer element first open end 28a and the silencer element throat void space 34. The circumferential void space 70 is cylindrical and has an axis coextensive with the filter element axis 31.

When the assembly is in the connected orientation or in the operable orientation, the silencer element 28 may be removed from the carrier 26 with ease. The nut 62 is unthreaded from and removed from the lug 60. The unitary filter element is moved in the first direction 43 away from the carrier base 25 and the throat void space 30 is moved to not overlap the carrier bracket 24. Once the unitary filter element 20 is removed from the carrier 26, the silencer element is removed from the carrier 26. To remove the silencer element 28, as a single unit, the element is grabbed by hand and moved by an operator in the first direction 43 away from the carrier base 25. The element second end wall 29 is removed off the circumferential sealing surface 49b and from being around the bracket 24.

The filter element 20 and silencer element 28 when in the operable orientation delimit an air intake path along which air travels. The path extends through the filter media 20a of the filter element 20. The portion of the path extending through the filter media 20a passes through the media's 20a radially outward surface 20a" and then through the media's radial inward surface 20a'. The path from the radial inward surface 20a' extends into the circumferential void space 70. Subsequent to extending into the circumferential void space 70, the path extends in the silencer throat void space 34. From the throat, the path extends to and through the air outlet 47. In operation air travels through the filter media 20a along the path and into the machines air intake.

Sound waves in the circumferential void space 70 pass through the silencer element through openings 41b delimited by the silencer element second sidewall 41 to the sound absorbing media 33. The sound waves interact with the sound absorbing media 33 and are absorbed by the sound absorbing media. Sound waves in the silencer element throat void space 35 pass through the inner sidewall wall void spaces 37b to the sound absorbing media 33. The sound waves are absorbed by the sound absorbing media 33.

Although the components and features of the herein described COMBINATION FILTER AND SILENCER ASSEMBLY are recited as being circumferential and circumferential cylindrical and cylindrical, the features and components could have a variety of shapes including, without limitation, oval, square, rectangular, triangular or some other shape.

As is evident from the foregoing description, certain aspects of the present invention are not limited to the details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention. Other aspects, objects, and advantages of the present invention can be obtained from a study of the drawings, the disclosures, and the appended claims.

The invention claimed is:

1. A combination filter element and silencer element assembly comprising:

sound absorbing media forming part of the silencer element, said sound absorbing media having a cylindrical shape, said sound absorbing media is porous, air permeable, and sound absorbing, said sound absorbing media has an inward porous and air permeable surface that delimits a silencer throat void space in a direction moving outward from a longitudinal axis of said silencer element, said sound absorbing media has an outward, porous, air permeable surface, said outward porous, air permeable surface has portions that are uncovered and exposed to a throat void space of the filter element;

a cylindrical, air permeable, and sound permeable silencer inner sidewall inward of said sound absorbing media, said cylindrical, air permeable, and sound permeable inner sidewall forming part of said silencer element, said silencer element cylindrical, air permeable, and sound permeable inner sidewall has an inward surface delimiting said silencer throat void space, said cylindrical, air permeable, and sound permeable silencer inner sidewall having structure delimiting void spaces which comprise through openings to the sound absorbing media inward porous and air permeable surface;

a cylindrical, air permeable, sound permeable silencer outer sidewall outward of said outward, porous, air permeable surface of said sound absorbing media, said silencer element cylindrical, air permeable, sound permeable outer sidewall has an outward surface relative to said silencer axis, said outward, cylindrical, air permeable, and sound permeable silencer air permeable outer sidewall has structure which delimits void spaces comprising through spaces to said outward, porous, air permeable surface of said sound absorbing media;

a first open end of the silencer element which provides a first open entry opening into the throat void space of said silencer element;

a second open end of the silencer element which delimits a second opening into the throat void space of said silencer element, said first open end of the silencer element axially opposite said second open end of said silencer element;

a first end wall at the first open end of the silencer element, said first end wall in the shape of a ring which forms the first open entry opening into the throat void space of the silencer element, said first end wall covers and is affixed to axial ends of the, cylindrical, air permeable, and sound permeable silencer inner sidewall and said cylindrical, air permeable, and sound permeable silencer outer sidewall of said silencer element, said first end wall overlaps axial ends of the sound absorbing media;

a second end wall at the second open end of the silencer element, said second end wall in the shape of a ring which delimits the second opening into the throat void space of the silencer element, said second end wall covers and is affixed to axial ends of the cylindrical, air permeable, and sound permeable inner sidewall and of the cylindrical, air permeable, and sound permeable outer sidewall of said silencer element, said second end wall overlaps axial ends of the sound absorbing media;

filter media of said filter element which is porous and air permeable, said filter media forms a cylindrical shape, said filter media has an inward surface that delimits the throat void space of said filter element in a direction moving radially outward from a filter element axis, said filter media has an outward surface, relative to the filter element axis and said filter media inner surface;

a first end of said filter element delimits a first opening into the throat void space of the filter element;

a second end of said filter element, axially opposite the first end, has a filter element end wall that closes and covers the filter element throat void space in the axial direction of the filter element axis;

a carrier having an air outlet, said air outlet delimiting an air outlet void space, said carrier having a base, and wherein;

the silencer element first and second end walls fix the cylindrical, air permeable, sound permeable silencer element outer sidewall and the cylindrical, air permeable, sound permeable silencer element inner sidewall in place relative to each other and relative to the sound absorbing media, to form a self-contained unit;

said silencer element second end wall forms an airtight seal with said carrier at said carrier air outlet, said silencer element throat void space opens into said void space of said carrier air outlet; and said filter element connected to said carrier and said silencer element disposed in said throat void space of said filter element.

2. The combination filter element and silencer element assembly of claim 1 wherein:
an expanded metal sidewall forms said silencer inner sidewall.

3. The combination filter element and silencer element assembly of claim 2 wherein:
an expanded metal wall forms said silencer outer sidewall.

4. The combination filter element and silencer element assembly of claim 3 further comprising:
a wire mesh of said silencer element, said mesh delimiting void spaces, said mesh has a cylindrical shape and is between said silencer element outer sidewall and said sound absorbing media outward surface, said void spaces of said mesh and silencer element outer sidewall overlap to comprise said through spaces to the sound absorbing media outward surface.

5. The combination filter element and silencer element assembly of claim 4, wherein:
said first end wall of said silence element formed with elastomeric material.

6. The combination filter element and silencer element assembly of claim 4, further comprising:
said second end wall of said silencer element formed with elastomeric material.

7. The combination filter element and silencer element assembly of claim 5, wherein:
said second end wall of said filter element is rubber.

8. The combination filter element and silencer element assembly of claim 7, wherein one can remove the silencer element as a unit by only gripping the first end wall of the silencer element.

9. The combination filter element and silencer element assembly of claim 8, wherein the second end wall of said silencer element creates said airtight seal with a circumferential surface of said carrier.

10. The combination filter element and silencer element assembly of claim 9, wherein the end wall covering the throat of the filter element at the second end of the filter element is a second end wall of the filter element, said combination further comprising:
at the first end of the filter element, a first end wall in the shape of a ring which delimits the first opening of the filter element, said filter element first end wall overlaps an axial end of the filter media, said first end wall is an elastomeric material and sits on a first seating surface of the carrier, said first seating surface being part of said carrier base.

11. The combination filter element and silencer element assembly of claim 10, further comprising:
a circumferential void space delimited in the radial direction going radially outward from the filter element axis by an inward surface of the filter media and said circumferential void space delimited in the radial direction going away from the inward surface of the filter media towards the silencer element axis by the sound absorbing radial outward surface of the silencer element and by the silencer element outer sidewall, said circumferential void space comprises a portion of the filter element throat void space, said circumferential void space opens up to said through spaces formed by said silencer element outer sidewall and to the sound absorbing media outer surface; and
an open area void space, delimited by the assembly, is open to both the circumferential void space, the silencer element first open end providing said first open entry opening into the silencer element throat void space.

* * * * *